(12) United States Patent
Sakata et al.

(10) Patent No.: US 6,903,899 B2
(45) Date of Patent: Jun. 7, 2005

(54) MAGNETIC DISK DEVICE WITH WIND SHIELD MEMBERS

(75) Inventors: Masaharu Sakata, Kawasaki (JP);
Tsuneyori Ino, Kawasaki (JP);
Mitsuaki Yoshida, Kawasaki (JP);
Tomohiro Nagamori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 09/960,093

(22) Filed: Sep. 21, 2001

(65) Prior Publication Data

US 2002/0149876 A1 Oct. 17, 2002

(30) Foreign Application Priority Data

Apr. 13, 2001 (JP) ........................................ 2001-115287

(51) Int. Cl.[7] .............................. G11B 33/14; G11B 5/48
(52) U.S. Cl. .................................................... 360/97.03
(58) Field of Search ............................ 360/97.02, 97.03, 360/97.04

(56) References Cited

U.S. PATENT DOCUMENTS

| | | | |
|---|---|---|---|
| 4,703,379 A | 10/1987 | Bogdanski | 360/118 |
| 5,134,530 A | 7/1992 | Hall | 360/97.02 |
| 6,091,570 A | 7/2000 | Hendriks | 360/97.03 |
| 6,097,568 A * | 8/2000 | Ekhoff | 360/97.02 |
| 6,449,119 B1 * | 9/2002 | Hashizume et al. | 360/97.03 |
| 6,549,365 B1 * | 4/2003 | Severson | 360/97.02 |

FOREIGN PATENT DOCUMENTS

| | | | |
|---|---|---|---|
| EP | 450 184 | | 10/1991 |
| JP | 58-70459 A | * | 4/1983 |
| JP | 61-196494 | | 8/1986 |
| JP | 2-56790 | | 2/1990 |
| JP | 3-83202 A | * | 4/1991 |
| JP | 4-109468 A | * | 4/1992 |
| JP | 6-302153 A | * | 10/1994 |

* cited by examiner

Primary Examiner—Jefferson Evans
(74) Attorney, Agent, or Firm—Greer, Burns & Crain, Ltd.

(57) ABSTRACT

The magnetic disk device includes magnetic disks, magnetic head arms and wind shield members arranged above and below the magnetic disks, respectively, in a region adjacent to the magnetic head arms. The wind shield members are arranged on the rotationally upstream side of the magnetic head arms, and the air flow generated by the rotation of the magnetic disks and impinging against the magnetic head arms is guided to the outside of the magnetic disks.

8 Claims, 7 Drawing Sheets

MAGNETIC DISK DEVICE WITH WIND SHIELD MEMBERS

BACKGROUND OF THE INVENTION

1. Field of the Invention

The present invention relates to a magnetic disk device with wind shield members.

2. Description of the Related Art

In a magnetic disk device, in general, read and write operations are carried out, with respect to a magnetic disk rotating at a high speed, by a magnetic head floating over the magnetic disk, and a positioning operation of the magnetic head is performed by driving a magnetic head arm carrying the magnetic head at the forward end thereof.

Above the magnetic disk, on the other hand, an air flow is generated, by the high-speed rotation of the magnetic disk, and acts as an external force against the magnetic head or the magnetic head arm. The external force of the air flow, though low in absolute value, acts as an unforeseeable external disturbance affecting the positioning operation, and therefore is not negligible in the case where the track density is high and a high positioning accuracy is required.

SUMMARY OF THE INVENTION

The present invention is developed in view of the situation described above, and the object thereof is to provide a magnetic disk device in which the magnetic recording density can be improved by improving the positioning accuracy.

A wind shield member is arranged, with a small gap, above a magnetic recording surface of a magnetic disk in a region of the magnetic disk on the rotationally upstream side of a magnetic head arm. The air flow generated over the magnetic recording surface by the high-speed rotation of the magnetic disk flows in the direction of rotation of the magnetic disk and, therefore, the air flow impinges against the wind wield member before impinging against the magnetic head arm. As a result, the external force exerted by the air flow on the magnetic head arm is reduced, and therefore, an unstable factor in the positioning operation is reduced, so that the magnetic head can be driven accurately to the correct position. The air flow generated over the magnetic disk has such a speed distribution that the speed becomes a maximum on the outer peripheral portion of the magnetic disk, and therefore the wind shield member is arranged at least on the outer peripheral portion of the magnetic disk.

The generation of an excessively turbulent flow due to the air flow impinging against the wind shield member acts as a resistance force to the rotation of the magnetic disk. Therefore, a curved guide surface for guiding the air flow to the outside of the magnetic disk after impinging against the wind shield member is preferably formed on the edge of each wind shield member on the rotationally upstream side thereof.

Also, each wind shield member 3 prevents the direct impact of the air flow against the magnetic head arm, and therefore, a surface element opposed to the magnetic recording surface of the magnetic disk is not necessarily required. In the case where opposed surface portions of a predetermined area are formed and placed in proximity to the upper and lower surfaces of the magnetic disk, however, an air bearing structure is formed between the upper and lower surfaces of the magnetic disk and the opposed surface portions, thereby making it possible to suppress displacement of the magnetic disk in the direction of a thickness thereof (a disk fluttering phenomenon).

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

FIGS. 1 to 3A show a magnetic disk device of an embodiment of the present invention. The magnetic disk device comprises a box-shaped disk case 8 comprising a base body 8a and a cover plate 8b coupled with each other, and magnetic disks 1, magnetic head arms 2 and a wind shield block 6 are hermetically accommodated in the disk case 8. Each magnetic disk 1 has a magnetic recording surface on each of the upper and lower surfaces thereof, and a plurality of the magnetic disks 1 are rotatably arranged about a rotation axis c1. A shroud 8c for surrounding the outer peripheries of the magnetic disks 1 is arranged as near as possible to the outer peripheries of the magnetic disks 1 in the disk case 8, thereby preventing generation of disk fluttering phenomenon which arises due to the air flow between vertically adjacent magnetic disks 1.

Figure 1:
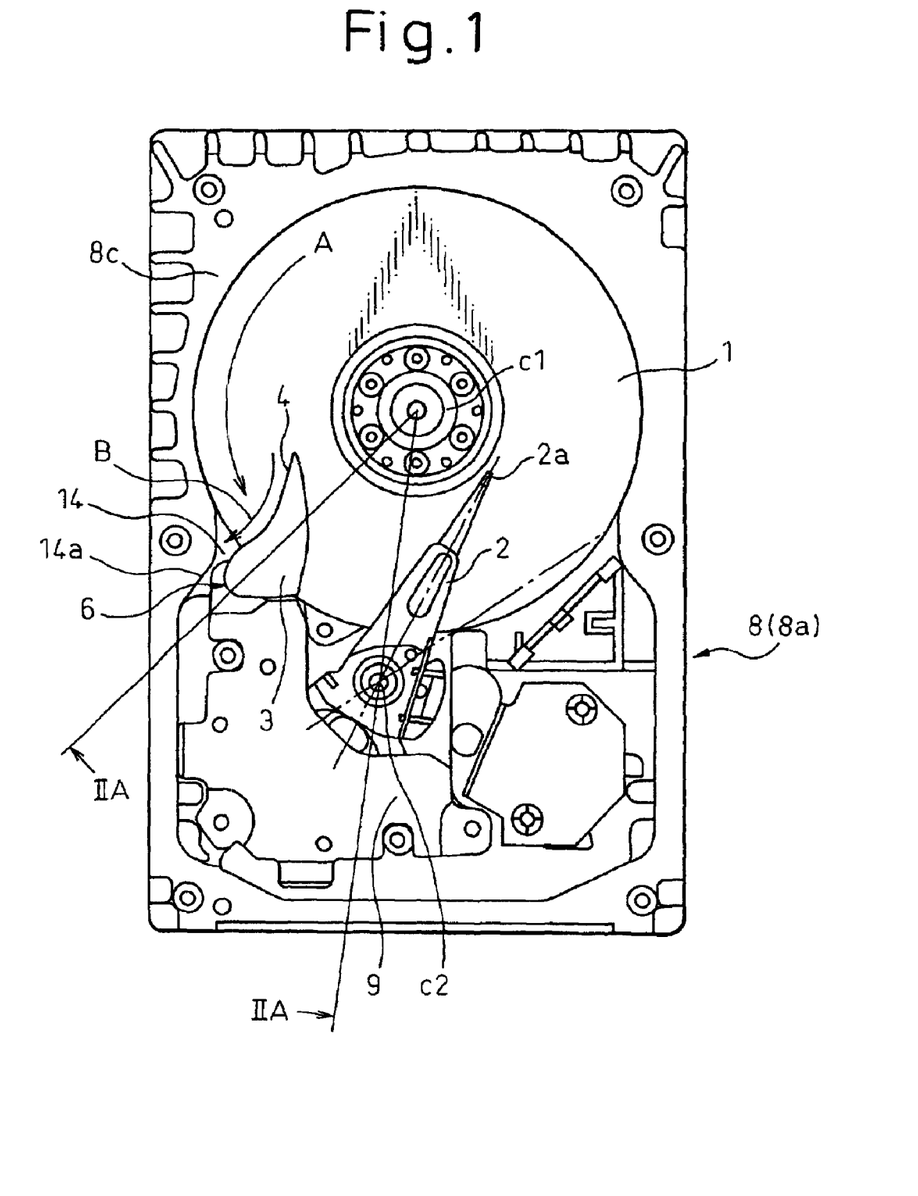
FIG. 1 is a view showing a magnetic device according to an embodiment of the present invention.

The magnetic head arms 2 are rotationally driven about a rotation axis c2 by a magnetic circuit 9 in such a manner that a magnetic head slider 2a held by the magnetic head arm 2 at the forward end thereof can be moved to a predetermined position above or below the magnetic disk 1 by energization of the magnetic circuit 9.

Figure 2A:
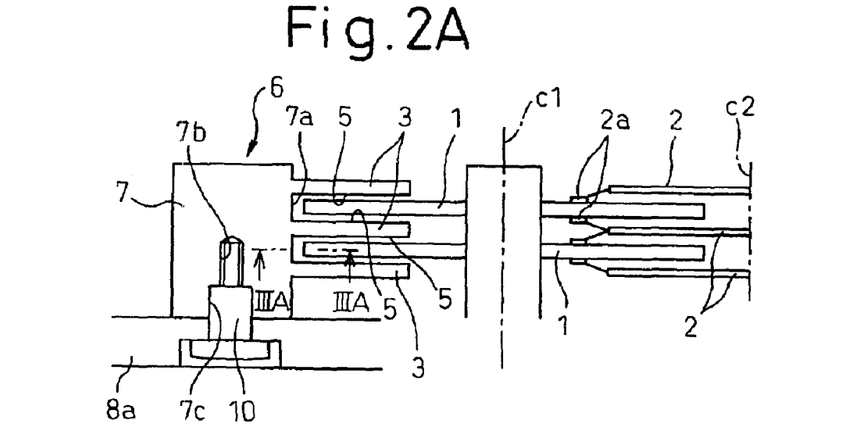
FIG. 2A is a cross-sectional views of FIG. 1, taken in line 2A—2A in FIG. 1.
Figure 2B:
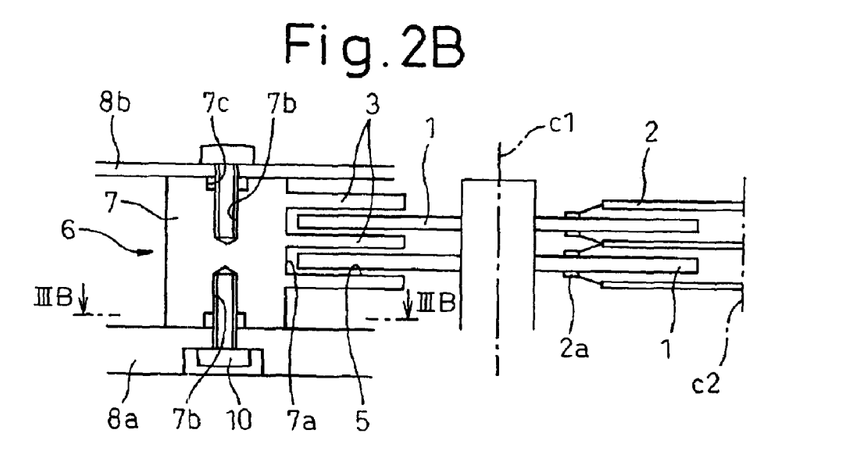
FIG. 2B is a cross-sectional view showing a modification of the magnetic disk device of FIG. 2A.

The wind shield block 6 is made of a hard material such as aluminum and includes a support post 7 and a plurality of wind shield members 3, 3, integral with and transversely extending from the support post 7. The wind shield block 6 is fixed to the base body 8a by engaging a fixing element 10 such as a screw into a threaded hole 7b formed in the lower end of the support portion 7, as shown in FIG. 2A. Alternatively, the wind shield block 6 can be fixed to the base body 8a and the cover plate 8b, as shown in FIG. 2B, as required.

Figure 3A:
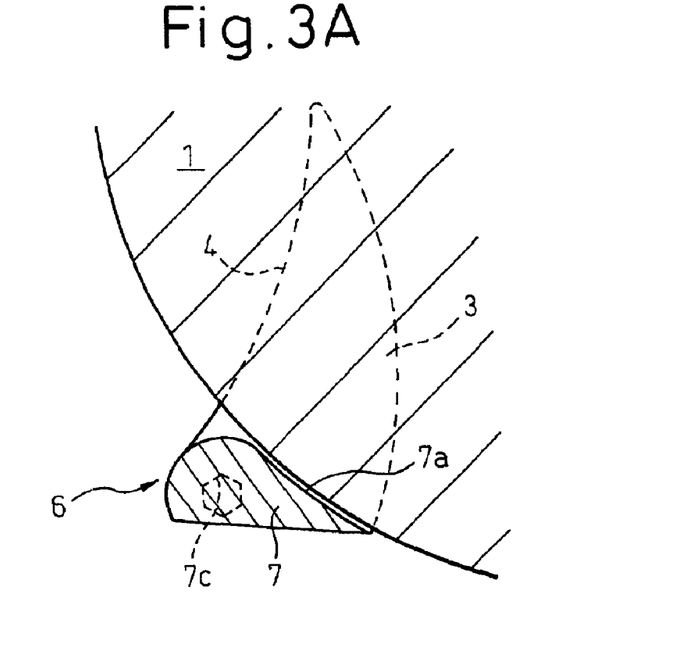
FIG. 3A is a cross-sectional views of the magnetic disk device, taken on line 3A—3A in FIG. 2A.

The support post 7 of the wind shield block 6, has a curved surrounding surface 7a having a curvature slightly larger than the curvature of the outer periphery of the magnetic disk 1, as viewed from above, as shown in FIG. 3A, and in the state fixed to the disk case 8, the curved surrounding surface 7a surrounds the outer periphery of the magnetic disks 1 thereby to prevent the generation of the disk fluttering phenomenon.

The upper and lower surfaces of the wind shield members 3 have smooth surface portions 5 in opposed relation to the upper and lower surfaces of the corresponding magnetic disks 1, and are arranged above or below the magnetic disks 1 with a small gap maintained between the opposed surface portion 5 and the lower or upper surface of the magnetic disk 1. The wind shield member 3 is arranged in a region of the magnetic disk 1 adjacent to and on the rotationally entrance side of the magnetic head arm 2 (upstream side of the magnetic head arm 2 in view of the air flow), i.e. in the region on the left side of the magnetic head arm 2 in this embodiment in which the magnetic disk 1 rotates counter-clockwise as indicated by arrow A in FIG. 1. Also, the edge of each wind shield member 3 on the rotationally entrance side is formed as a curved guide surface 4 with the central portion thereof having a concave shape, as viewed from above.

Figure 4A:
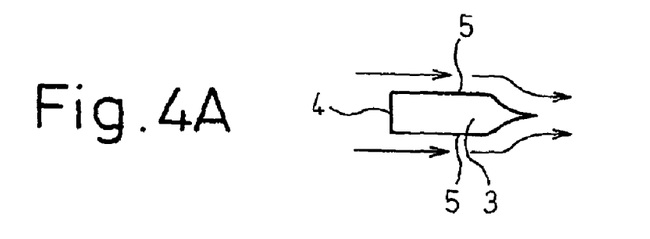
FIGS. 4A to 4F are schematic cross-sectional views of examples of the wind shield member, cut away along the direction of rotation of the magnetic disk.
Figure 4B:
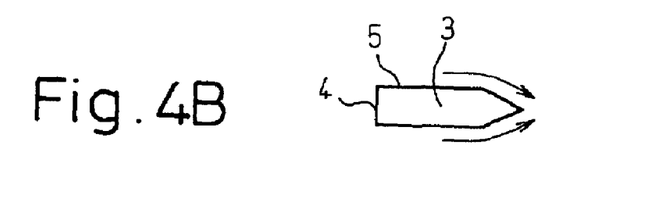
Figure 4C:
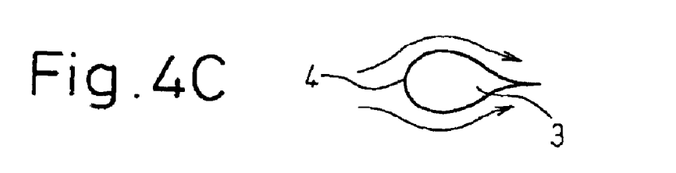
Figure 4D:
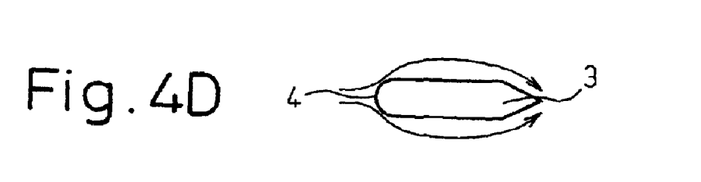
Figure 4E:
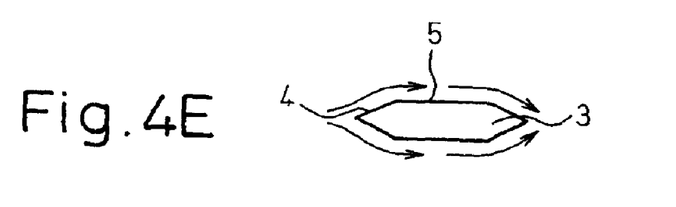
Figure 4F:
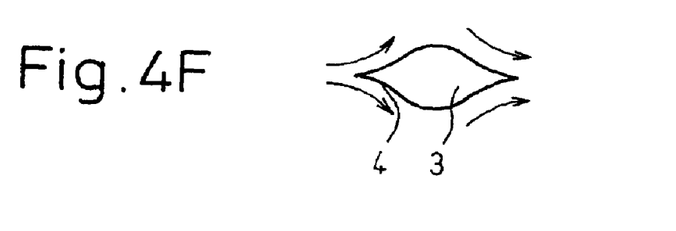

In this embodiment comprising a plurality of magnetic disks 1 stacked vertically, each wind shield member 3 is inserted in the gap between the adjacent magnetic disks 1, as shown in FIG. 2, and the curved guide surface 4 is formed utilizing the thickness component of the wind shield member 3. This curved guide surface 4 can be formed by a surface perpendicular to the opposed surface portion 5, as shown in FIGS. 4A and 4B. As alternatives, the curved guide surface 4 can be formed by a curved surface protruding on the rotationally entrance (upstream) side, as shown in FIGS. 4C and 4D, or by a curved surface in an acute form on the rotationally entrance side, as shown in FIGS. 4E and 4F. Also, in the case where the cross-sectional shape of the wind shield member 3 is formed in the shape which becomes progressively thinner toward the rear edge (end on the rotationally exit side), as shown in FIGS. 4A to 4F, the generation of the turbulent flow at the rear edge can be prevented.

Figure 5A:
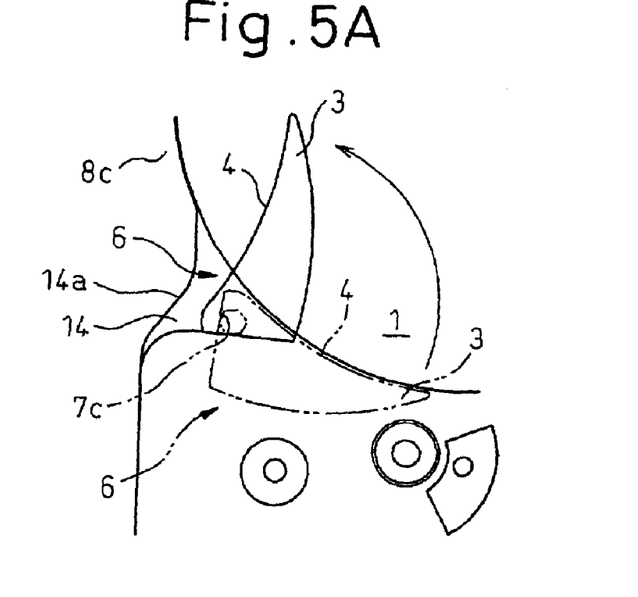
FIG. 5A is a view showing a method of mounting the wind shield member.
Figure 5B:
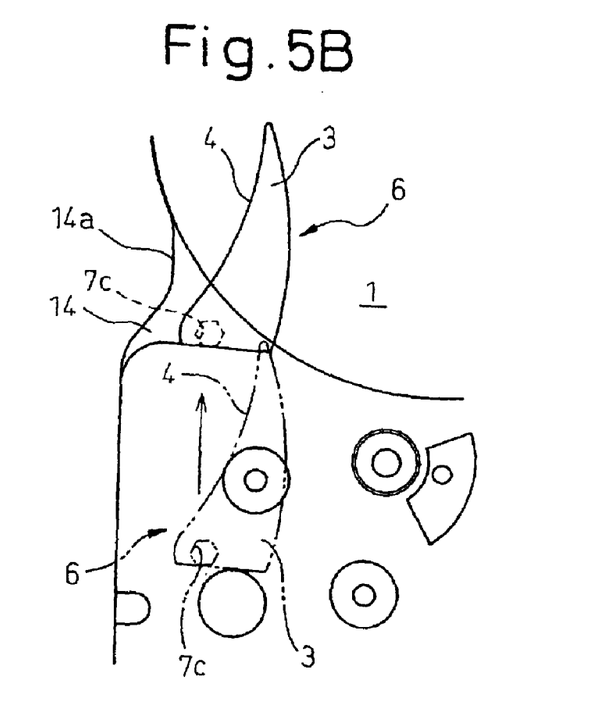
FIG. 5B is a view showing another method of mounting the wind shield member.

The wind shield block 6 described above can be mounted in such a manner that it is set at a position shown by the chain line in FIGS. 5A and 5B beforehand, and after the assembly work of the magnetic disks 1 is completed, it is rotated (FIG. 5A) or moved in parallel (FIG. 5B) to set the wind shield members 3 above or below the magnetic disks 1. In this case, when moving the wind shield block 6 to the mounting position, the spigot portion 7c formed in the lower end or the upper end of the support post 7 can be used as a holding part for the mounting tool.

Figure 3B:
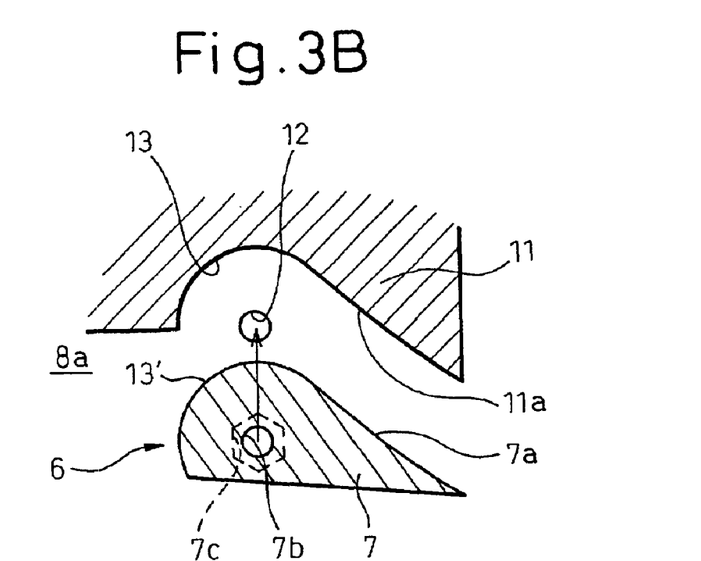
FIG. 3B is a cross-sectional view, taken in line 3B—3B in FIG. 2B, illustrating the operation of fixing the wind shield block.

For surrounding the outer periphery of the magnetic disks 1 in closer proximity to the curved surrounding surface 7a, the wind shield block 6 is required to be fixed with a higher accuracy. For this purpose, the base body 8a includes a positioning wall 11 for abutment of the half surface of the support portion 7 on the side of the magnetic disk 1 (FIG. 3B). The positioning wall 11 can restrict the motion of the support post 7 at least in the X-Y perpendicular directions and in the direction of θ (rotation) in a plan view. However, in the case of the configuration in which the wind shield block 6 is led to the fixed position by rotation, as shown in FIG. 5A, arcuate portions 13 and 13' connected to the curved surrounding surface 7a by a common normal line are desirably formed on the support post 7 and the positioning wall 11 about the threaded hole 7b and the fixing element through-hole 12 on the base body 8a. With this configuration, first, the arcuate portions 13 and 13' are abutted against each other, and thereafter, the curved surrounding surface 7a is rotated along the arcuate portions 13 and 13' until the curved surrounding surface 7a comes into contact with the corresponding portion 11a of the positioning wall 11. In this simple way, an accurate fixed position and orientation can be ensured for an improved assembly workability.

Figure 2C:
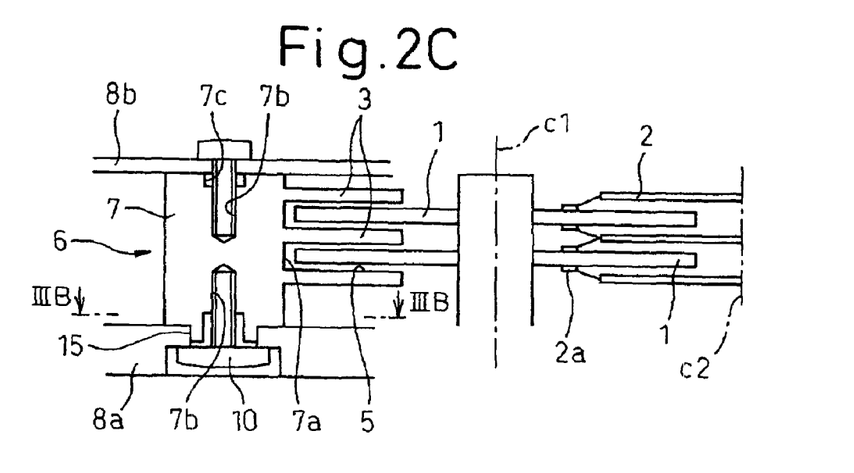
FIG. 2C is a cross-sectional view showing another modification of the magnetic disk device of FIG. 2A.

Also, a protrusion 15 may be formed on the support portion 7, as shown in FIG. 2C. With this configuration, the protrusion 15 is loosely fitted in the fixing element through-hole 12, instead of abutting the arcuate portions 13 and 13' against each other, to improve the assembly workability.

In this embodiment, therefore, the air flow generated above or below the magnetic disks 1 with the rotation of the magnetic disks 1 impinges against the curved guide surface 4 before it impinges against the magnetic head arm 2, and is guided to the outside of the magnetic disks 1 along the curvature guide surface 4, as indicated by arrow B in FIG. 1. In order to assure the smooth air flow toward the outside of the magnetic disks 1, a reservoir 14 for the air flow released by the curved guide surface 4 is formed on the disk case 8. The entrance to the reservoir 14 is formed with a leading curved portion 14a for smoothly leading the air flow into the reservoir 14 (FIGS. 5A and 5B)

As a result, the magnetic head arms 2 are not subjected to an unstable force by the air flow generated over the magnetic disks 1, and the fact that each magnetic disk 1 is held by the opposed surface portions 5 in the direction of the thickness can prevent the disk fluttering phenomenon.

Figure 6A:
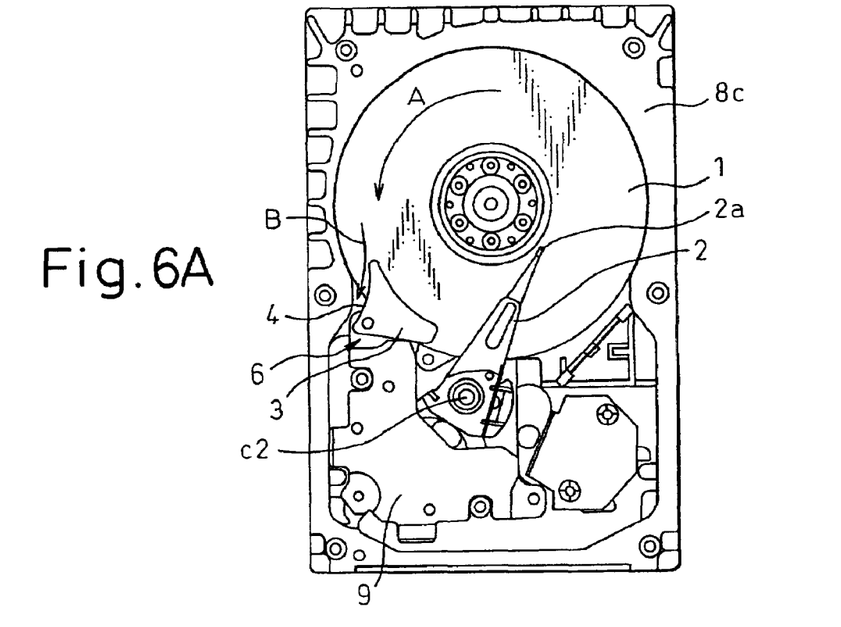
FIG. 6A is a view showing a modification of the wind shield member.

Although each wind shield member 3 is arranged to reach about one half of the radius of the magnetic disk 1 in the aforementioned case, only the outer peripheral portion of the magnetic disk 1 can be covered as shown in FIG. 6A. In this case, in spite of a somewhat reduced air bearing effect, the rotation resistance component of the magnetic disks 1 due to the air bearing effect is reduced, thereby making it possible to reduce the size of the motor for rotating the magnetic disks 1.

Figure 6B:
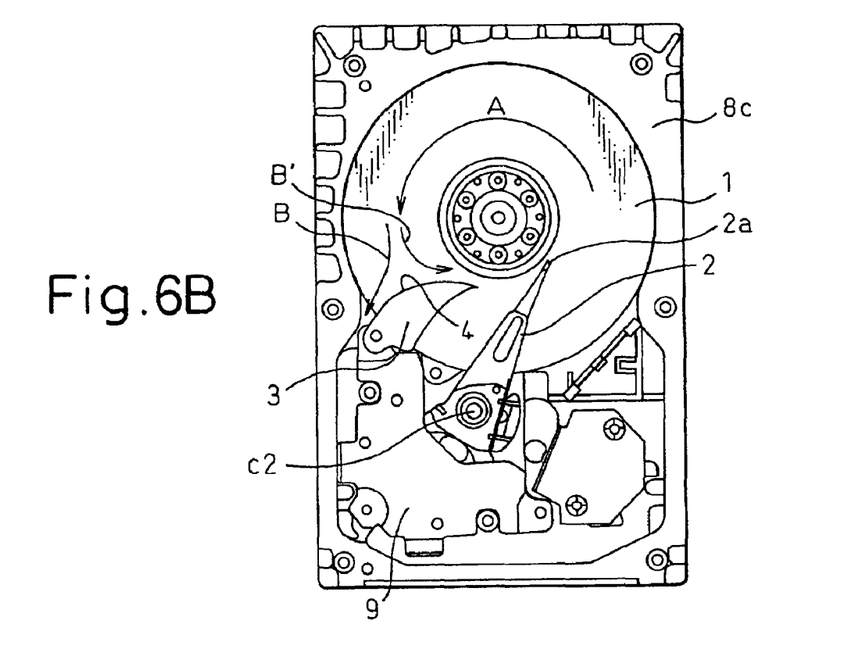
FIG. 6B is a view showing a further modification of the wind shield member.

Also, the curved guide surface 4 can be formed with a convex curved surface at the center, as shown in FIG. 6B, instead of by a concave curved shape at the center. In this case, the generated air flow, as indicated by arrows B and B' in FIG. 6B, branches toward the rotational center and toward the outer periphery of the magnetic disk 1 at a position in the vicinity of the top (forward end of bombarding air flow) of the curved guide surface 4. Thus, the air flow in the neighborhood of the outer peripheral portion which has a high flow rate and a large external force exerted on the magnetic head arm 2 at the time of impingement can be led out of the magnetic disk 1.

Figure 7A:
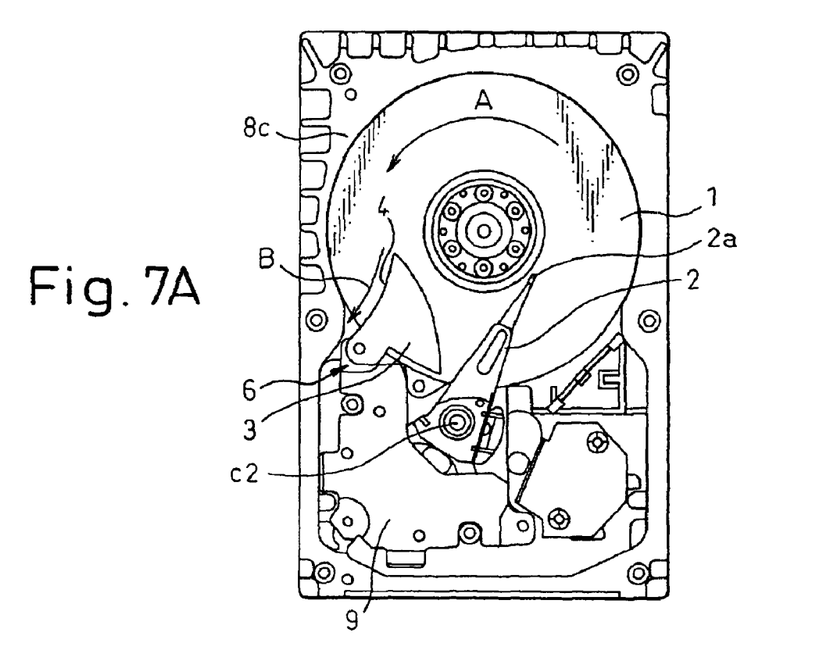
FIG. 7A is a view showing a further modification of the wind shield member.
Figure 7B:
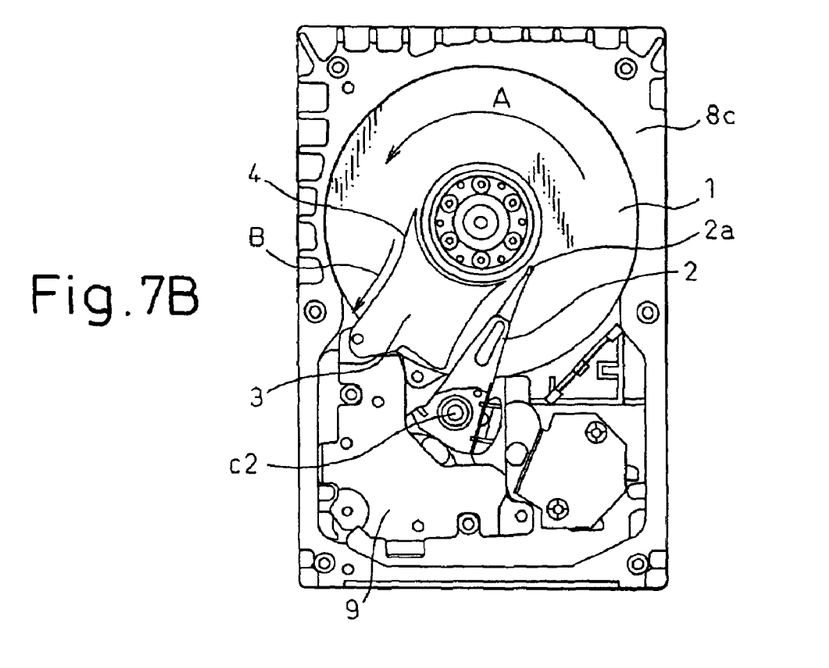
FIG. 7B is a view showing a further modification of the wind shield member.

Further, as shown in FIGS. 7A and 7B, by increasing the area of the opposed surface portions 5, the air bearing effect is increased and the disk fluttering phenomenon can be suppressed even more effectively. In this case, as shown in FIG. 7B, the arrival of the air flow at the magnetic head arm 2 can be remarkably reduced by forming the magnetic disk 1 in such a manner that the region of the magnetic disk 1 from the outer periphery to the innermost periphery of the magnetic recording portion is covered.

As is clear from the foregoing description, according to the present invention, the influence of the air flow flowing over the disks can be reduced, and therefore the positioning accuracy can be improved.

What is claimed is:

1. A magnetic disk device comprising:

magnetic disks;

magnetic head arms providing access to the magnetic disks; and wind shield members each arranged above or below said magnetic disks in a region adjacent to and on the rotationally upstream side of said magnetic head arms for restricting the impact of an air flow generated by the rotation of the magnetic disks against the magnetic head arms, said wind shield members having an entrance edge and an exit edge, said exit edge being downstream of said entrance edge in a rotational direction of said air flow, wherein said entrance edge has a curved guide surface, looking perpendicular to surfaces of said magnetic disks, for guiding the generated air flow to the outside of the magnetic disks, and wherein said entrance edge is concavely curved and is not parallel to said exit edge, which is convexly curved.

2. A magnetic disk device according to claim 1, wherein said wind shield members have a cross-sectional shape which becomes progressively smaller toward an edge thereof on the rotational exit side.

3. A magnetic disk device according to claim 1, wherein said wind shield members have surface portions arranged opposed to, and in proximity with, upper and lower surfaces of said magnetic disks, whereby the generated air flow is introduced between said surface portions and the magnetic disks thereby to prevent the magnetic disks from being displaced in the direction of the thickness thereof.

4. A magnetic disk device comprising:

magnetic disks;

magnetic head arms providing access to the magnetic disks; and wind shield members each arranged above or below said magnetic disks in a region adjacent to and on the rotationally upstream side of said magnetic head arms for restricting the impact of an air flow generated by the rotation of the magnetic disks against the magnetic head arms, said wind shield members having an entrance edge and an exit edge, said exit edge being downstream of said entrance edge in a rotational direction of said air flow, wherein said entrance edge has a curved guide surface looking perpendicular to surfaces of said magnetic disks, for guiding the generated air flow to the outside of the magnetic disks, wherein said entrance edge is not parallel to said exit edge, and wherein said wind shield members are formed in a wind shield block, said wind shield block having a support post and said wind shield members transversely extending from said support post, said support post having a curved surrounding surface concentric with said magnetic disks and surrounding an outer periphery of the magnetic disks with a small gap therebetween.

5. A magnetic disk device comprising:

magnetic disks;

magnetic head arms providing access to the magnetic disks; and wind shield members each arranged above or below said magnetic disks in a region adjacent to and on the rotationally upstream side of said magnetic head arms for restricting the impact of an air flow generated by the rotation of the magnetic disks against the magnetic head arms;

wherein said wind shield members are formed in a wind shield block, said wind shield block having a support post and said wind shield members transversely extending from said support post, said support post having a curved surrounding surface concentric with said magnetic disks and surrounding an outer periphery of the magnetic disks with a small gap therebetween.

6. A magnetic disk device according to claim 5, wherein said wind shield members have a cross-sectional shape which becomes progressively smaller toward an edge thereof on the rotationally exit side.

7. A magnetic disk device comprising:

magnetic disks;

magnetic head arms providing access to the magnetic disks; and wind shield members each arranged above or below said magnetic disks in a region adjacent to and on the rotationally upstream side of said magnetic head arms for restricting the impact of an air flow generated by the rotation of the magnetic disks against the magnetic head arms;

wherein said wind shield members have surface portions arranged opposed to, and in proximity with, upper and lower surfaces of said magnetic disks, whereby the generated air flow is introduced between said surface portions and the magnetic disks thereby to prevent the magnetic disks from being displaced in the direction of the thickness thereof, and wherein the surface portion of the wind shielding member has an inner side facing the center of the disks, said inner side having a dimension greater than a dimension which is radially measured between the inner side and the outer periphery of the disks.

8. A magnetic disk device according to claim 7, wherein said wind shield members have a cross-sectional shape which becomes progressively smaller toward an edge thereof on the rotationally exit side.

* * * * *